US 6,424,897 B1

(12) United States Patent
Mattes et al.

(10) Patent No.: US 6,424,897 B1
(45) Date of Patent: Jul. 23, 2002

(54) DEVICE FOR PRODUCING A SIGNAL TO INITIATE ACTUATION OF A SECURITY SYSTEM IN A VEHICLE MAKING AN OVERTURN

(75) Inventors: Bernhard Mattes, Sachsenheim; Volker Breunig, Heilbronn-Neckargartach; Michael Henne, Zaberfeld; Lothar Groesch, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,101

(22) PCT Filed: Jun. 18, 1998

(86) PCT No.: PCT/DE98/01669
§ 371 (c)(1),
(2), (4) Date: Jun. 19, 2000

(87) PCT Pub. No.: WO99/17962
PCT Pub. Date: Apr. 15, 1999

(51) Int. Cl.$^7$ ................................................ B60R 21/32
(52) U.S. Cl. .................... 701/45; 280/735; 180/282; 340/429
(58) Field of Search ................ 701/45, 46, 47; 340/436, 438, 429; 307/10.1; 280/734, 735; 180/274, 282

(56) References Cited

U.S. PATENT DOCUMENTS

| 5,890,084 A | * 3/1999 | Halasz et al. ................. 701/45 |
| 6,002,974 A | * 12/1999 | Schiffmann ................... 701/45 |
| 6,038,495 A | * 3/2000 | Schiffmann ................... 280/735 |
| 6,169,946 B1 | * 1/2001 | Griessbach .................... 701/45 |
| 6,170,594 B1 | * 1/2001 | Gilbert ........................ 180/282 |
| 6,192,305 B1 | * 2/2001 | Schiffmann ................... 701/45 |

FOREIGN PATENT DOCUMENTS

| DE | 0 430 813 | 6/1991 |
| DE | 196 09 176 | 9/1997 |
| DE | 196 09 717 | 9/1997 |

\* cited by examiner

Primary Examiner—Gary Chin
(74) Attorney, Agent, or Firm—Kenyon & Kenyon

(57) ABSTRACT

So that an arrangement may decide to trigger a safety device in as error-free and reliable a manner as possible, provision is made for a first arrangement, which derives a first decision criterion for triggering a safety device from the measured turning rate at least about the longitudinal axis of the vehicle and/or from the measured accelerations at least in the direction of the transverse axis and the vertical axis of the vehicle. In addition, a second arrangement is present, which, independent of the first arrangement, derives a second decision criterion. A circuit arrangement then generates a triggering signal for the safety device, when both decision criteria are satisfied at the same time.

3 Claims, 3 Drawing Sheets

DEVICE FOR PRODUCING A SIGNAL TO INITIATE ACTUATION OF A SECURITY SYSTEM IN A VEHICLE MAKING AN OVERTURN

BACKGROUND INFORMATION

The present invention relates to an arrangement for generating a triggering signal for a safety device in a motor vehicle in response to a rollover process, provision being made for a first arrangement, which derives a first decision criterion for the triggering of a safety device in the motor vehicle from the turning rate measured at least for the longitudinal axis of the motor vehicle and/or from the accelerations measured at least in the direction of the transverse axis and the vertical axis of the motor vehicle. A previously proposed arrangement for generating a trigging signal for a motor vehicle safety device is described in German Published Patent Application No. 196 09 176 A1.

In the event that a motor vehicle experiences a rollover, all of the passenger protective devices installed in the vehicle must be triggered in a timely fashion, including, for example, roll bar, seat-belt tensioner, front and side airbags, etc. For all of these protective devices to be triggered in a timely fashion, it is important to detect as early as possible whether the turning motions of the vehicle about its longitudinal axis, its transverse axis, or its vertical axis are going to lead to a rollover. As a rule, rollover processes occur about the longitudinal axis of the motor vehicle, turning motions of the vehicle about its vertical axis and its transverse axis occurring only seldom. The safety devices in the vehicle also should be actually triggered only when a rollover is in fact occurring to the vehicle.

European Published Patent Application No. 0 430 813 depicts an arrangement, discussed above, for generating a triggering signal for a safety device in response to a rollover process of a motor vehicle. For detecting various rollover processes of a vehicle, the output signals of a turning rate sensor and of three acceleration sensors are evaluated. In order to be able to detect various types of rollover situations, provision is made for a plurality of combinations of the four sensor signals. The triggering signals yielded from the various sensor signal evaluations are fed here to an OR gate, which, if one of the possible triggering signals is applied at its inputs, conveys a triggering command to a triggering device for a roll bar or other safety devices.

In the event of a lateral impact of the vehicle with a low obstacle, e.g., a curb, the vehicle suffers a quite powerful tilting motion, leading to a rollover. It is thus an object of the present invention to indicate an arrangement capable of detecting a rollover process of a vehicle, in a timely fashion and with great reliability.

SUMMARY OF THE INVENTION

The aforementioned objective is achieved in that a circuit arrangement generates a triggering signal if the turning rate about the longitudinal axis and the acceleration in the direction of the transverse axis both exceed a threshold value at the same time, the threshold value for the turning rate and the threshold value for the acceleration being selected such that the safety device is triggered in response to a lateral impact of the vehicle with a low obstacle—e.g., a curb.

It is advantageous to bring into consideration a second decision criterion. For this purpose, in parallel to the threshold value decisions for the turning rate about the longitudinal axis and the acceleration in the direction of the transverse axis, the circuit arrangement carries out a second threshold value decision regarding the acceleration in the direction of the transverse axis, the second threshold value decision being based on a different acceleration threshold value than the first threshold value decision. The parallel branch, as soon as the other acceleration threshold value has been exceeded for a preselected time duration, decides for triggering the safety device, and the circuit arrangement emits the triggering signal only when the decision for triggering has been made in both circuit branches at the same time.

In accordance therewith, the second decision criterion can be derived from the turning rate and/or the accelerations using measuring signals that are different from those measuring signals used for the derivation of the first decision criterion. The second arrangement also can derive the second decision criterion from the measuring signals of the turning rate and/or of the accelerations in accordance with a different algorithm than that used by the first arrangement for the first decision criterion.

Advantageously, the first arrangement, from the measured turning rates about all three vehicle axes, determines the position of a vehicle-fixed point projected onto a horizontal plane, and, if the projected point goes beyond the limits of a vehicle-fixed surface, also projected onto the horizontal plane, the first arrangement decides for triggering the safety device. Parallel to this, the first arrangement can calculate the rotational energy of the vehicle from the measured turning rates about all three vehicle axes, and it decides for triggering the safety device if the rotational energy exceeds a threshold value. This procedure is particularly effective if the safety device is to be triggered as quickly as possible.

To ensure that an offset error of the turning rate sensors does not lead to an erroneous decision due to temperature or age, an integration of the measured turning rates, resulting in a tilt angle and a pitch angle of the vehicle for deriving the first decision criterion, is only started if the value for the turning rate exceeds a minimum value.

The second arrangement, advantageously, is designed so that it calculates the tilt angle from the measured accelerations in the direction of the vertical axis and in the direction of the transverse axis and/or it calculates the pitch angle from the measured accelerations in the direction of the vertical axis and in the direction of the longitudinal axis, and that, if the tilt angle or the pitch angle exceeds a threshold value, it decides for triggering the safety device. The second arrangement can also execute a threshold value decision regarding the value of the measured acceleration in the direction of the vertical axis, and, if the acceleration exceeds, for example, 0.2 times the value of gravitational acceleration, it can decide for triggering the safety device. Thus it is assured that if the vehicle finds itself in a weightless state through lifting off from the ground, the second decision criterion is derived.

The safety device in the vehicle should also be triggered if the vehicle experiences a lateral impact with a low obstacle, for example a curb, without its leading necessarily to a rollover. For this purpose, provision is made for a circuit arrangement that generates a triggering signal if the turning rate about the longitudinal axis and the acceleration of the vehicle in the direction of the transverse axis both simultaneously exceed a threshold value. In order to exclude the possibility of an erroneous decision here also, it is advantageous not to stop at this one decision criterion, but rather to consult a further decision criterion. For this purpose, parallel to the threshold value decisions regarding the turning rate about the longitudinal axis o and regarding the acceleration in the direction of the transverse axis, the circuit arrangement carries out a second threshold value decision with respect to the acceleration in the direction of the transverse axis, the second threshold value decision being based on a different acceleration threshold value than the first threshold value decision. The parallel branch, as soon as the other acceleration threshold value has been exceeded for a predetermined amount of time, decides for triggering the safety device, and the circuit arrangement only emits the triggering signal if the decision has been made simultaneously in both circuit branches for triggering.

DETAILED DESCRIPTION

Figure 1:
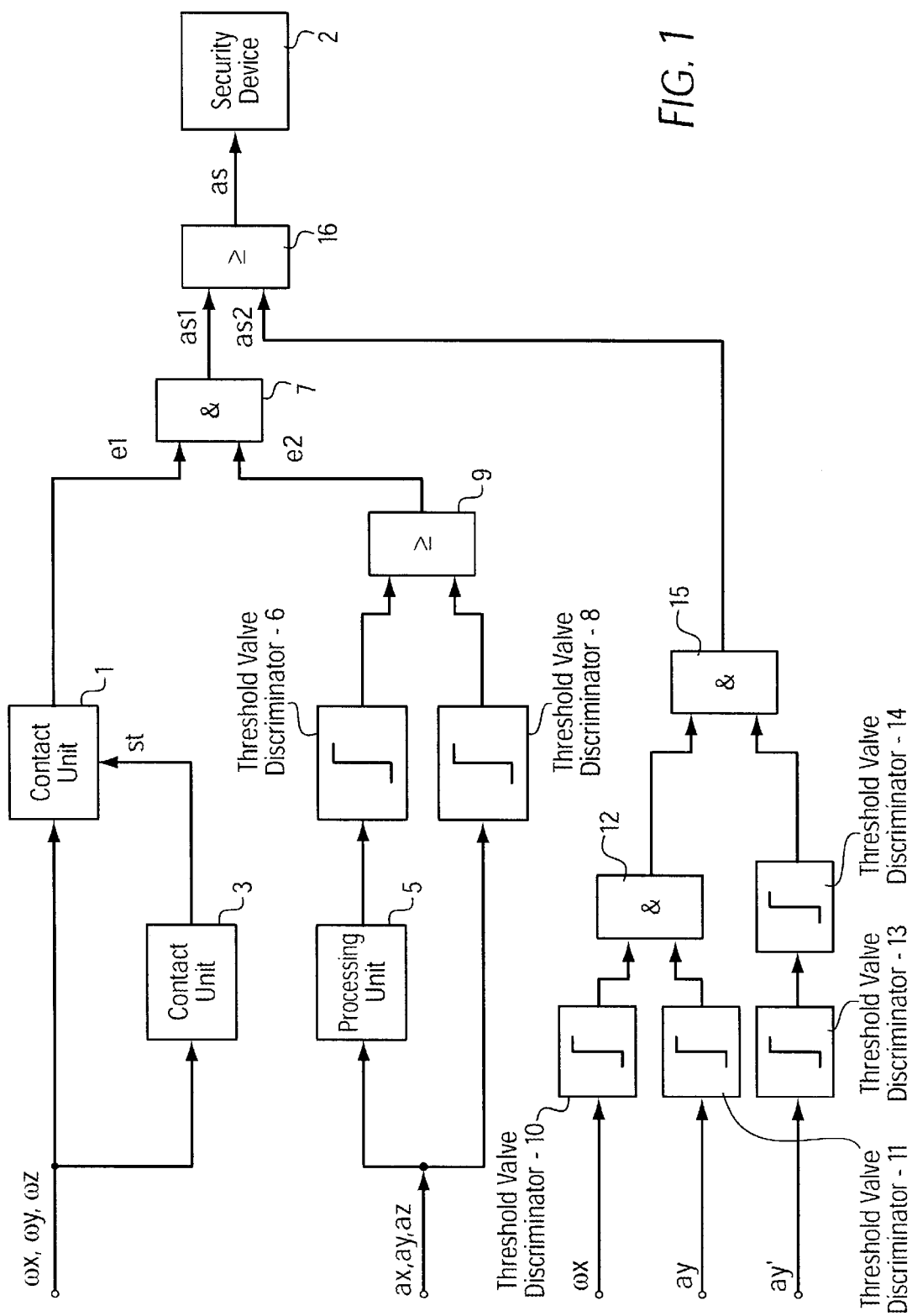
FIG. 1 depicts a block diagram of an arrangement for generating a triggering signal for a safety device in response to a rollover process of a motor vehicle.

As can be seen from FIG. 1, at the input of a first signal branch, there are present turning rate signals ωx, ωy, and ωz, which have been measured by turning rate sensors about longitudinal axis x, transverse axis y, and vertical axis z of a motor vehicle. Turning rate signals ωx, ωy, and ωz are fed to a contact unit 1 having an integrator, which from the turning rates formulates the angle of inclination of the vehicle with respect to its axes. From the angles of inclination, in a processing unit in contact unit 1, described in greater detail below, a first decision criterion e1 is derived for triggering a security device 2, which can be composed of, for example, one or a plurality of airbags and belt tighteners.

The output signals furnished by the turning rate sensors usually contain an offset, which is a function of various variables such as temperature and age. On account of this offset, a permanent integration of the turning rate signals would lead to angles of inclination that originate not with the vehicle turning motions but with the offset. To avoid this error, a start signal st is fed to the integrator in contact unit 1, the start signal indicating the turning rate at which the integration is to begin. Start signal st is formulated by a contact unit 3, which, after a filtering, compares turning rates ωx, ωy, and ωz to a threshold value. If the value of the turning rate exceeds this empirically determined threshold value, then start signal st is sent to integrator 1. Thus disruptive influences on the turning rate measurements, such as the aforementioned offset or braking and acceleration maneuvers, are excluded from the integration.

Figure 2:
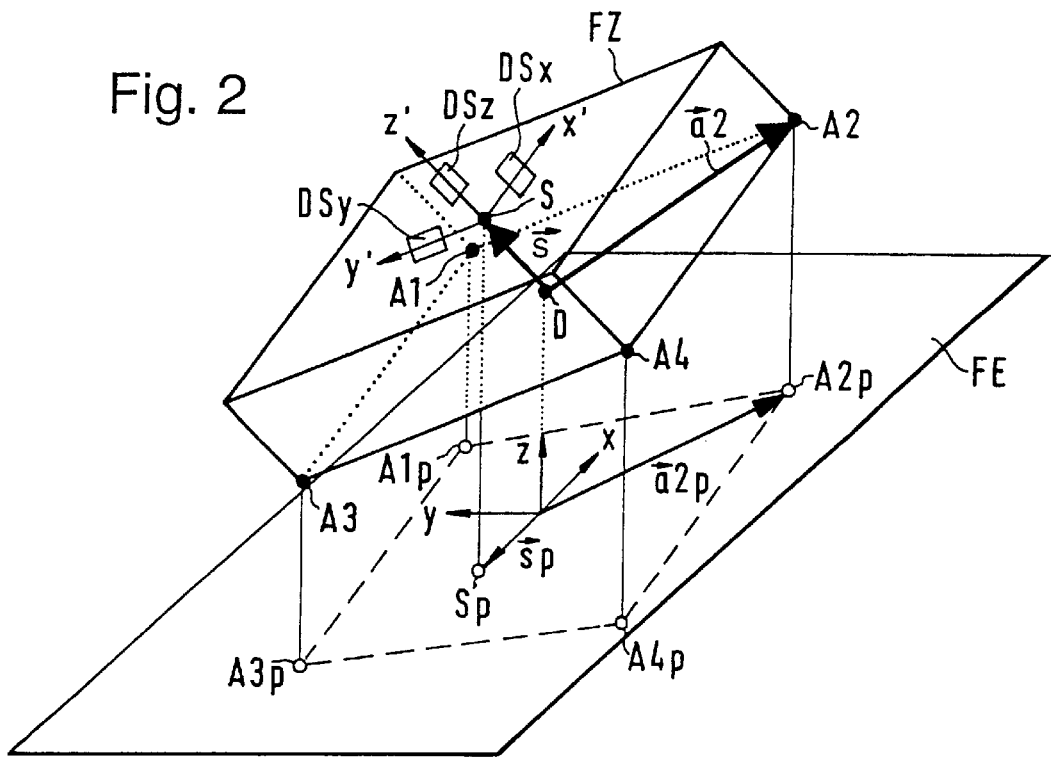
FIG. 2 depicts a schematic representation of vehicle, using a geometry for calculating the tilt position of the vehicle in accordance with a first type.
Figure 3:
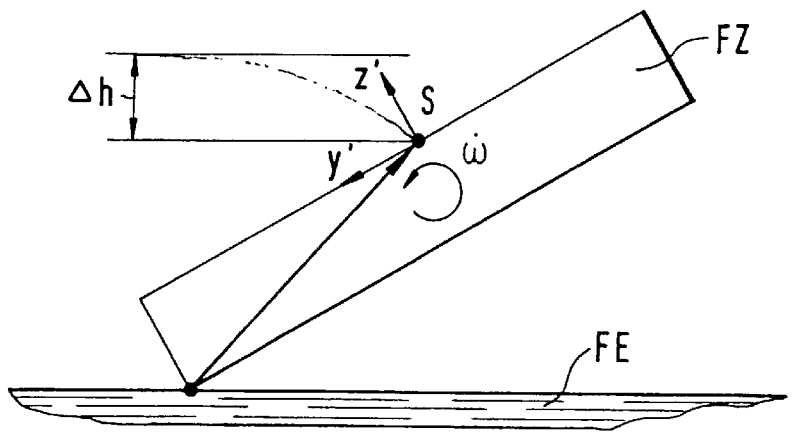
FIG. 3 depicts a schematic representation of a vehicle, using a geometry for calculating its tilt position in accordance with a second type.
Figure 4:
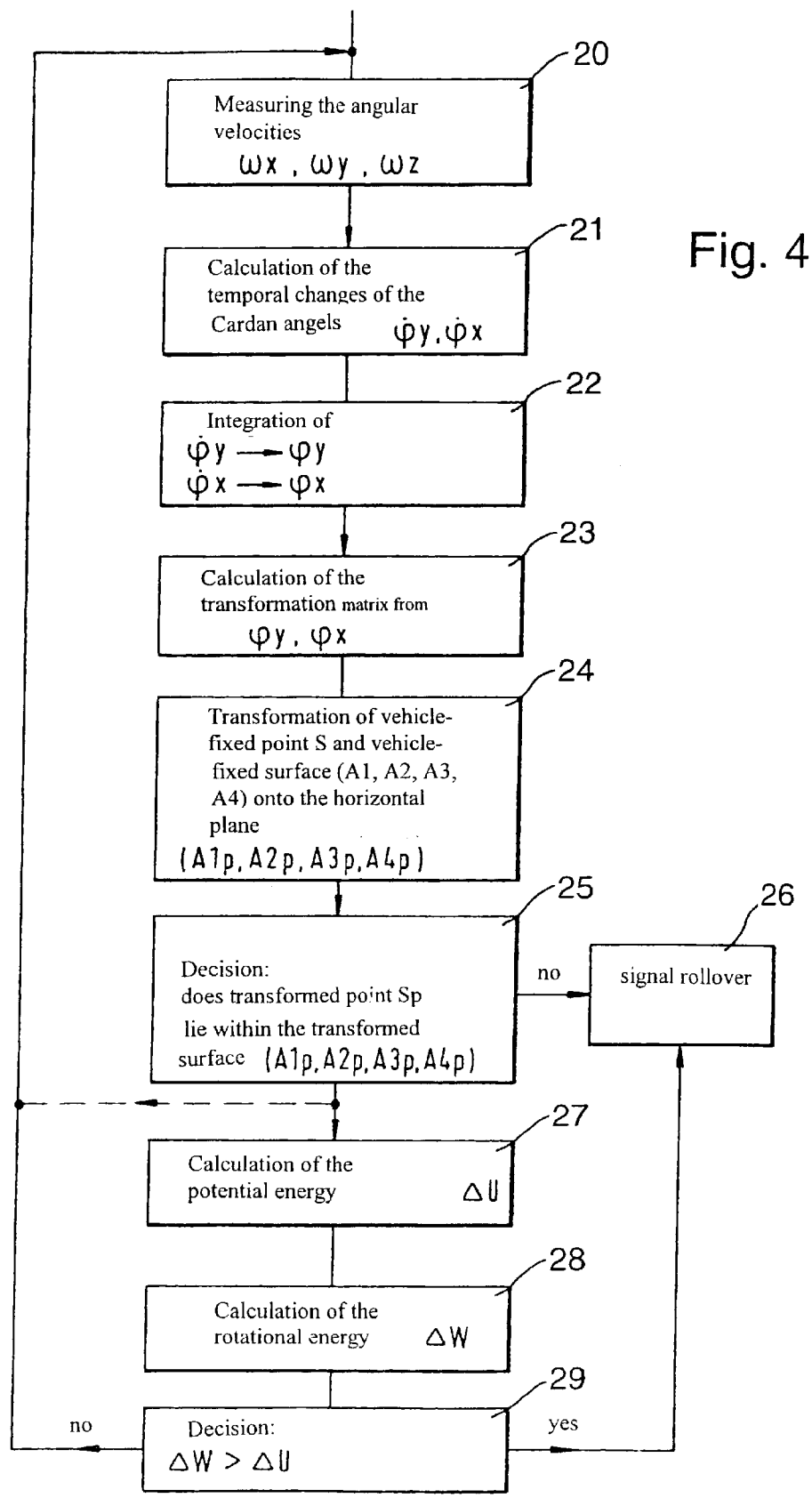
FIG. 4 depicts a flowchart for the determination of rollover information.

On the basis of FIGS. 2, 3, and 4, a possible, suitable algorithm is described, in accordance with which processing unit in the contact unit derives first decision criterion e1 for triggering security device 2.

FIG. 2 schematically depicts a vehicle FZ, which is found in a tilt position over a horizontal plane FE, preferably the roadway plane. Vehicle FZ has turning rate sensors DSx, DSy, and DSz, which measure angular speeds ωx, ωy, and ωz about longitudinal axis x, transverse axis y, and vertical axis z of the tilted vehicle. The center of this coordinate system is an imaginary vehicle-fixed point S, preferably the vehicle center of gravity. In accordance with the flowchart depicted in FIG. 4, the measurement of angular speeds ωx, ωy, and ωz is carried out in method step 20.

In method step 21, from angular speeds ωx, ωy, and ωz in accordance with equation (1), temporal changes $\dot{\phi}x$, $\dot{\phi}y$, of Cardan angles $\phi x$ and $\phi y$ with respect to longitudinal axis x and transverse axis y are calculated:

$$\begin{pmatrix} \dot{\phi}y \\ \dot{\phi}x \end{pmatrix} = \begin{pmatrix} 0 & \cos\phi y & -\sin\phi x \\ 1 & \tan\phi y \sin\phi x & \tan\phi y \cos\phi x \end{pmatrix} \begin{pmatrix} \omega x \\ \omega y \\ \omega z \end{pmatrix} \quad (1)$$

Cardan angle $\phi z$ is not required because a turning about the vertical axis of the vehicle is not of practical relevance for a rollover. Cardan angles $\phi x$ and $\phi y$ are calculated by integrating the temporal changes of Cardan angles $\phi x$ and $\phi y$, in method step 22. From Cardan angles $\phi x$ and $\phi y$, in method step 23, transformation matrix T, indicated in equation 2, is calculated:

$$T = \begin{pmatrix} \cos\phi y & \sin\phi x \cdot \sin\phi y & \cos\phi x \cdot \sin\phi y \\ 0 & \cos\phi x & -\sin\phi x \\ -\sin\phi y & \sin\phi x \cdot \cos\phi y & \cos\phi x \cdot \cos\phi y \end{pmatrix} \quad (2)$$

For the further calculations, in addition to above-mentioned vehicle center of gravity S, a vehicle-fixed surface is stipulated. This vehicle-fixed surface, in FIG. 2, extends between points A1, A2, A3, and A4, these points possibly being, for example, the wheel contact points of the vehicle. The coordinates of points A1, A2, A3, and A4, with respect to the vehicle's own coordinate system (x, y, z), can be described using vectors, which emanate from a point D in the vehicle-fixed surface. In FIG. 2, for example, vector $\vec{a}$ 2 is indicated from point D to corner point A2. These vectors, going from point D to corner points A1, A2, A3, and A4, have only x and y components, because their departure point D arises by projecting coordinate point of intersection S onto the surface extending between points A1, A2, A3, and A4. Vector $\vec{s}$ from point D to point S has only a z component. As a result of this choice of vectors $\vec{s}$ and $\vec{a}$ i (i=1, 2, 3, 4), there is a minimum of vector components, making all further calculations much simpler.

As a result of the transformation, executed in method step 24 with the assistance of previously calculated transformation matrix T, of the vehicle-fixed surface, extending between corner points A1, A2, A3, and A4, and of vehicle-fixed point S, both the vehicle-fixed surface and vehicle-fixed point S are projected in a horizontal plane. In this context, in the horizontal plane there appears a surface bordered with a dotted line that extends between projection points A1p, A2p, A3p, and A4p corresponding to points A1, A2, A3, and A4. In the same horizontal plane is also projection point Sp, corresponding to vehicle-fixed point S. Point D, projected onto the horizontal plane, forms the origin of a coordinate system having axes x', y', and z', the z' axis lying in the direction of projection. Vectors $\vec{a}$ ip (i=1, 2, 3, 4), emerging from the origin of this coordinate system x', y', z' and leading to corner points A1p, A2p, A3p, and A4p of the projected surface, are derived from multiplying corresponding vectors $\vec{a}$ i of the vehicle's own coordinate system with transformation matrix T, in accordance with equation (2). Similarly, vector $\vec{s}$ p, describing the location of projected point Sp, is formed by multiplying transformation matrix T with vector $\vec{s}$ in the vehicle's own coordinate system. With the assistance of vectors $\vec{a}$ ip and $\vec{s}$ p, it can be decided, in method step 25, whether point Sp lies inside or outside the surface extending between points A1p, A2p, A3p, and A4p. If point Sp lies outside of this surface, then a rollover can be predicted with certainty for the vehicle. Accordingly, in a method step 26, a rollover is signaled, i.e., first decision criterion e1 is emitted for triggering safety device 2.

It can be seen from FIG. 4 that method step 25 is followed by three further method steps 27, 28, and 29. In these three method steps 27, 28, and 29, a criterion for a rollover is derived according to a different method. These method steps, as represented in FIG. 4, are either appended to the previously described calculation method or they are carried out by themselves, without the other method or parallel to the other method.

In method step 27, a potential energy ΔU is calculated, which is required to bring the vehicle from its current position into an unstable position, from which the vehicle will roll over. As clarified in FIG. 3, vehicle-fixed point S would have to increase its distance from the depicted current position with respect to horizontal plane FE by an amount Δh. Then the vehicle-fixed point would have reached its maximum distance with respect to horizontal plane FE. If the vehicle turns to the extent that the vehicle-fixed point reaches this maximum distance with respect to horizontal plane FE, then the vehicle would unavoidably experience a rollover. Potential energy ΔU is calculated in method step 27 in accordance with equation (3):

$$\Delta U = m\, g \Delta h \qquad (3)$$

In this context, m is the known mass of the vehicle and g is the gravitational acceleration. Difference Δh between the current distance of vehicle-fixed point S with respect to horizontal plane FE and the aforementioned maximum distance can be calculated by simple geometric calculations from the vehicle dimensions and previously calculated transformation matrix T. In the following method step 28, rotational energy ΔW of the vehicle is calculated in accordance with equation (4):

$$\Delta W = \tfrac{1}{2} \Theta \omega^2 \qquad (4)$$

In this context, Θ designates the mass moment of inertia of the vehicle, and ω is an angular speed about a vehicle axis measured by the turning rate sensors. In method step 29, it is decided whether rotational energy ΔW is larger than potential energy ΔU. If this is the case, then a rollover can be predicted with certainty for the vehicle. Accordingly, a rollover is signaled, satisfying decision criterion e1.

As a result of the energy considerations applied in method steps 27, 28, and 29, a rollover of the vehicle can be predicted in a timely fashion, so that, before the actual rollover, the security device can be triggered.

Parallel to the first signal path described above, there is a second signal path, which processes accelerations ax, ay, and az in the direction of its longitudinal axis x, its transverse axis y, and its vertical axis z, yielding a second decision criterion e2. This signal path contains a processing unit 5 and a threshold value discriminator 6. In processing unit 5, from measured acceleration az in the direction of vertical axis z and from measured acceleration ay in the direction of the transverse axis, tilt angle φx of the vehicle is calculated with respect to its longitudinal axis x by:

$$\phi x = \arctan\, ay/az \qquad (5)$$

If the pitch angle of the vehicle is also to be calculated about its transverse axis y, then this occurs in accordance with equation (6):

$$\phi y = \arctan\, ax/az \qquad (6)$$

After the calculation of tilt angle φx and/or pitch angle φy, they are subjected to a threshold value decision 6. If tilt angle φx and/or pitch angle φy exceed an empirically determined threshold, then second decision criterion e2 is satisfied. Thus, in the first signal path and in the second signal path, two decision criteria e1 and e2 are determined in different ways for triggering the safety devices. Even different sensor signals are used, in one case turning rate signals and, in the other case, acceleration signals. As a result, sensor signal errors arising in one of the two signal paths do not lead to an erroneous triggering of safety device 2. Since, in addition, different algorithms are used for calculating decision criteria e1 and e2 in the two signal paths, even a disruption in the processing units cannot lead to an erroneous triggering. Only if both decision criteria e1 and e2, linked via an AND gate 7, are fulfilled, does AND date 7 at its output emit a triggering signal as1 for safety device 2.

If the vehicle leaves the ground and thus becomes weightless, accelerations of the vehicle in the direction of the longitudinal axis and of the transverse axis can no longer be measured. In order to be able to determine a second decision criterion e2 even in this case, provision is made for a threshold value discriminator 8, which, if the value of measured acceleration az in the direction of vertical axis z exceeds, for example, 0.2 times the value of the gravitational acceleration, then the decision is made for triggering safety device 2. The output signals of both threshold value discriminators 6 and 8 are applied at the inputs of an OR gate 9, which at its output emits second decision criterion e2, if either in contact unit 6 or in contact unit 8, or in both simultaneously, the respective threshold value has been reached.

In the event of a lateral impact of the vehicle on a low obstacle, for example a curb, the vehicle passengers can be jolted so as to pose a danger of injury in response to the high acceleration that initially arises. In order that, in this case, even if no rollover of the vehicle occurs, the security device is triggered, provision is made, as is depicted in FIG. 1, for a separate circuit arrangement, which generates a triggering signal as2. The circuit arrangement contains two threshold value discriminators 10 and 11, which are linked via an AND gate 12. Threshold value discriminator 10 receives, as an input signal, a turning rate ωx measured about the longitudinal axis x of the vehicle. Second threshold value discriminator 11 receives measuring signal ay from acceleration sensor measuring high accelerations (greater than 10 g) of the vehicle in the direction of its transverse axis y. If both turning rate ωx and acceleration ay exceed a prescribed, empirically determined threshold, then it is assumed that the lateral impact of the vehicle on a low obstacle is leading to a tilt motion that is so strongly accelerated that, for the protection of the passengers, the security device is triggered. Accordingly, the output of AND gate 12 produces a triggering signal.

In order to avoid an erroneous triggering also in this circuit arrangement through, for example, erroneous measuring signals, provision is made for a parallel branch having two threshold value discriminators 13 and 14, whose output signal, together with the output signal of AND gate 12, is fed to a further AND gate 15. In the parallel branch, a second criterion for triggering signal as2 is derived. And only if both signal branches, applied to the inputs of AND gate 15, decide for a triggering of the safety device does AND gate 15 emit triggering signal as2.

Threshold value discriminator 13 in the parallel branch has fed to it measuring signal ay' of an acceleration sensor measuring lesser accelerations (up to 3 g) of the vehicle in the direction of its transverse axis y. If this lesser acceleration ay' exceeds a prescribed, empirically determined threshold, and measured acceleration ay' is above the threshold for an empirically determined minimum time period, then this second criterion for the triggering of the safety device is satisfied. Second threshold value discriminator 14 checks as to whether measured acceleration ay' exceeds its prescribed threshold for the minimum time duration. If the criteria determined in the two signal branches are simultaneously satisfied for triggering safety device 2, it can be assumed that triggering signal as2 is based on an error-free sensing. Both triggering signals as1 and as2 are fed to an OR gate 16. If one of two triggering signals as 1 or as2 is applied to OR gate 16, safety device 2 receives actual triggering signal as.

In response to a lateral impact of the wheels of a vehicle with a curb, relatively high lateral accelerations occur, which cause a sudden passenger shift to the side. As a result of the fact that the main triggering criterion—acceleration ay in the direction of transverse axis y—is also linked to turning rate ωx, it can be determined with great certainty whether a rollover process is impending. In such a case, a triggering of the safety device takes place even when the vehicle has reached a turning angle of 10°. In the case of vehicle turning motions that are due to influences other than a lateral impact with a low obstacle (curb), no triggering of a safety device should take place in response to such a low turning angle as 10°. To this extent, it is expedient to make provision for a previously described sensor system exclusively for detecting a lateral impact with a low obstacle. In selecting threshold values for ωx, ay, and ay', consideration is given to lateral passenger motion. The safety device is triggered in a timely fashion so that, for example, a belt tightener can still have an effect; i.e., the passenger is not yet thrown out of the belt. In general, the passenger as yet should not have shifted too far.

What is claimed is:

1. An arrangement for generating a triggering signal for a safety device in a motor vehicle in response to a rollover process, comprising:

a first arrangement for deriving a first decision criterion for triggering the safety device, the first decision criterion being derived from a turning rate measured about a longitudinal axis of the motor vehicle;

a second arrangement for deriving a second decision criterion for triggering the safety device, the second decision criterion being derived independently of the first arrangement and from an acceleration measured in a direction of a transverse axis of the motor vehicle; and a circuit arrangement for generating the triggering signal if at the same time the turning rate about the longitudinal axis exceeds a first threshold value for the turning rate and the acceleration of the motor vehicle in the direction of the transverse axis exceeds a second threshold value for the acceleration, the first threshold value for the turning rate and the second threshold value for the acceleration being selected such that the safety device is triggered in response to a lateral impact of the motor vehicle with a low obstacle.

2. The arrangement according to claim 1, wherein:

the low obstacle corresponds to a curb.

3. The arrangement according to claim 1, wherein:

each decision regarding the first threshold value for the turning rate and the second threshold value for the acceleration occurs in a first circuit branch, the circuit arrangement carries out another threshold value decision in another circuit branch parallel to each decision regarding the first threshold value for the turning rate and the second threshold value for the acceleration, the other threshold value decision relating to a second acceleration in the direction of the transverse axis, the other threshold value decision is based on a lower acceleration threshold than the second threshold value, as soon as the lower acceleration threshold has been exceeded for a preselected time duration, the said another circuit branch triggers the safety device, and the circuit arrangement only emits the triggering signal when both said circuit branches decide at the same time to trigger the safety device.

\* \* \* \* \*